US009081801B2

(12) United States Patent
Lyons et al.

(10) Patent No.: US 9,081,801 B2
(45) Date of Patent: Jul. 14, 2015

(54) METADATA SUPERSETS FOR MATCHING IMAGES

(75) Inventors: Nicholas P. Lyons, Sunnyvale, CA (US); Feng Tang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 13/558,023

(22) Filed: Jul. 25, 2012

(65) Prior Publication Data
US 2014/0029854 A1 Jan. 30, 2014

(51) Int. Cl.
*G06K 9/46* (2006.01)
*G06K 9/62* (2006.01)
*G06F 17/30* (2006.01)

(52) U.S. Cl.
CPC .............................. *G06F 17/30265* (2013.01)

(58) Field of Classification Search
None
See application file for complete search history.

(56) References Cited

U.S. PATENT DOCUMENTS

| 7,271,809 B2* | 9/2007 | Fedorovskaya et al. ....... 345/581 |
| 7,502,795 B1* | 3/2009 | Svendsen et al. ..................... 1/1 |
| 7,519,200 B2 | 4/2009 | Gokturk et al. |
| 7,756,866 B2* | 7/2010 | Bhalotia et al. ............... 707/723 |
| 8,156,132 B1* | 4/2012 | Kaminski, Jr. ................ 707/758 |
| 8,180,667 B1* | 5/2012 | Baluja et al. ............... 705/14.19 |
| 8,185,513 B2* | 5/2012 | Wang et al. ................... 707/708 |
| 8,483,715 B2* | 7/2013 | Chen .......................... 455/456.3 |
| 2007/0172155 A1 | 7/2007 | Guckenberger |
| 2008/0306995 A1* | 12/2008 | Newell et al. .............. 707/104.1 |
| 2011/0022529 A1 | 1/2011 | Barsoba et al. |
| 2011/0173149 A1* | 7/2011 | Schon ............................. 706/48 |
| 2011/0211764 A1* | 9/2011 | Krupka et al. ................ 382/225 |
| 2011/0255736 A1 | 10/2011 | Thompson et al. |
| 2011/0320433 A1* | 12/2011 | Mohiuddin et al. .......... 707/714 |
| 2012/0076367 A1* | 3/2012 | Tseng ........................... 382/118 |

* cited by examiner

*Primary Examiner* — Daniel Mariam
(74) *Attorney, Agent, or Firm* — VanCott, Bagley, Cornwall

(57) ABSTRACT

A method for creating and using metadata supersets for matching images includes identify images from a first source of images and identify images from a second source of images. Images from the first source that match images from the second source are identified as matching images. Metadata associated with the matching images are extracted to form a superset of metadata for the matching images. The superset of metadata is analyzed to create a product.

20 Claims, 5 Drawing Sheets

METADATA SUPERSETS FOR MATCHING IMAGES

BACKGROUND

Metadata is often called "data about data." In general, metadata can describe the structure, content, history and intended usage of the data with which it is associated. As the data is used, copied or manipulated, the metadata can be deleted, updated, or additional metadata can be added.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
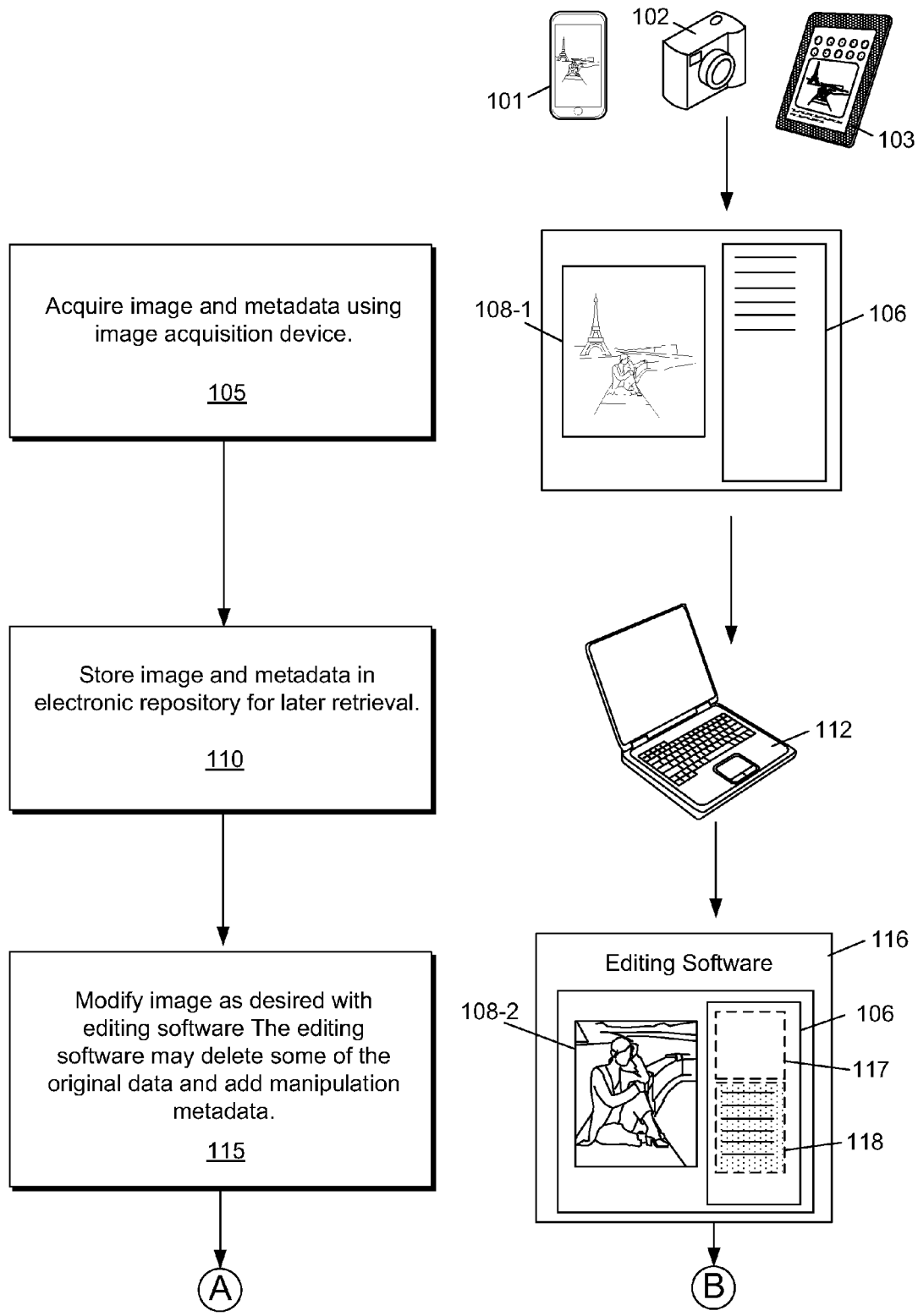
FIG. 1 is a flowchart and associated diagrams describing the generation and use of a metadata superset associated with matching images, according to one example of principles described herein.
Figure 1:
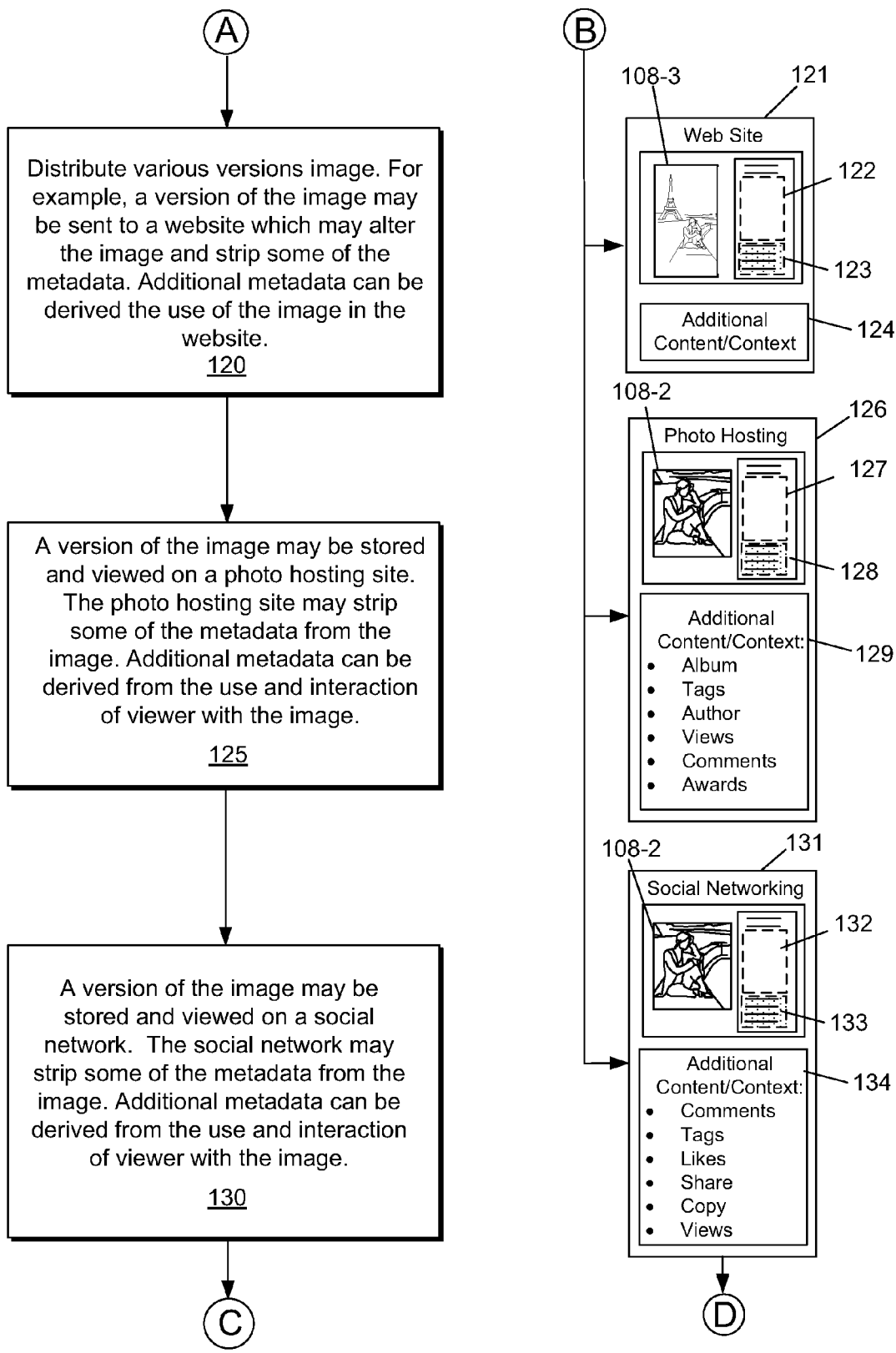
Figure 1:
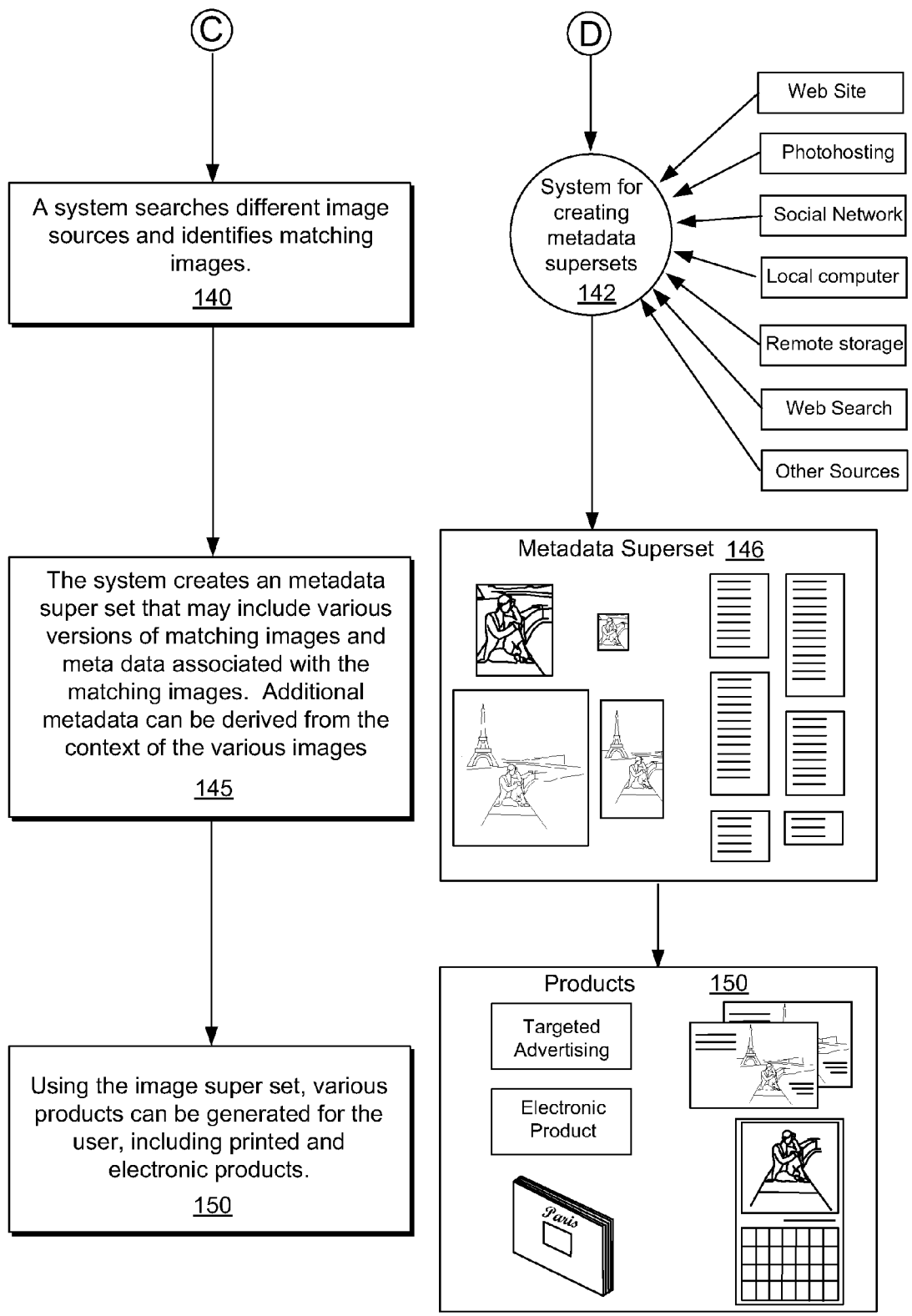

Metadata can be used in any context where it is desirable to associate additional information with a data set. For example, image data, video data, audio data, web pages, computer files, financial data, and control data can benefit from the inclusion of metadata. Metadata can be used for searching, classifying, authenticating, and ascertaining the data's fitness for a particular purpose. For example, a digital photo is a set of data. It is a series of ones and zeros arranged in a particular way, grouped into a data structure that can be interpreted and displayed on a computing device. Human users can view the image and comprehend the content. However, the addition of metadata to the image provides knowledge that goes beyond the content of the image. The metadata allows for a computing device to at least partially understand the context and meaning of the image.

Metadata can be used in a variety of applications, including automation of tasks and processes via software. Information provided in the metadata can allow the software to understand the image's data set and process it correctly. Metadata also enables segmentation of images into various types and categories. For example, metadata enables sorting, grouping, structuring, and prioritizing. Metadata can also be important in discovery of specific images within a collection of images. Searching metadata allows images related to specific keywords, categories, descriptions, characteristics and subjects to be identified and selected. Other metadata may record the way in which an image was used, including reactions of viewers to the image or derivative images.

Metadata enables a wide range of products to be automatically generated. This can save the user a significant amount of time. For example, a mother with several children may have a large number of digital images of her children, family events, vacations, sporting events, birthdays, holidays and other events. The mother may wish to organize and present these images in a meaningful way. However, the mother may feel overwhelmed by the task because of the sheer number of images, lack of time, lack of technical knowledge and number of decisions required. Using a rich set of metadata, a computing device could automatically generate a number of products to assist the mother. For example, a computing device may automatically generate products such as calendars, photo books, T-shirts, mugs, or holiday cards that feature appropriate and meaningful images of the mother's family and children. This significantly reduces the burden of organizing and presenting images or other data. Other products, such as targeted advertising, automatic blog updates, image distribution, or other electronic products, can also be enabled by metadata. The larger and more comprehensive the metadata set, the more effectively the computing device can assemble the desired product.

However, during the process of storing, manipulating, and distributing images, all or some of the metadata can be lost. This loss of metadata reduces the ability of a computing device to understand the content of an image. Additionally, derivative images, such as images that were cropped, color balanced, or otherwise altered, cannot be tracked to the original image using metadata. Consequently, a computing device cannot understand the complete context of an image and its derivative images using metadata.

The principles below describe systems and methods for reestablishing connections between matching images and creating a metadata superset that captures the technical, social, and emotional impact of the matching images. This allows a computing device or system to create meaningful physical and electronic products.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

The principles described herein may be embodied as a system, method or computer program product. The principles may take the form of an entirely hardware implementation, an implementation combining software and hardware aspects, or an implementation that includes a computer program product that includes one or more computer readable storage medium(s) having computer readable program code embodied thereon. Any combination of one or more computer readable storage medium(s) may be utilized. Examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Computer program code for carrying out operations according to the principles described herein may be written in any suitable programming language. Program code embodied on a computer readable medium may be transmitted using any appropriate medium, including but not limited to wireless, wire line, optical fiber cable, RF, etc., or any suitable combination of the foregoing.

FIG. 1 is a flowchart and associated diagrams describing the generation and use of a metadata superset for matching images. A variety of devices can be used to create images and metadata, including mobile phones (101), cameras (102), tablets (103), and other devices (block 105). Some image metadata (106) may be automatically generated during the creation of the image (108). For example, the image metadata (106) may include the make/model of the camera or other device that took the image, the shutter speed, the aperture value, the exposure time, the date/time the image was taken, the focal length, the ISO (International Organization for Standardization) value, if flash was used, and the geospatial location where the image was taken. This metadata is called "creation metadata" because it is generated as the image is created. Metadata may be stored in a variety of formats including Exchange Image File Format (EXIF), Extensible Metadata Platform (XMP) and International Press Telecommunications Council (IPTG) formats.

The image and its associated metadata is then stored in an electronic repository for later retrieval (block 110). The electronic repository may be any of a variety of devices, including flash storage devices, local or remote computing devices, mobile devices, image hosting sites, or other suitable devices. For example, the image may be taken with a mobile phone (101) and stored on a laptop (112). Additionally or alternatively, the image may be sent directly to an image hosting site from the mobile device.

The image can be retrieved for viewing and modification from the electronic repository. For example, the image and/or metadata may be modified using image editing software (116) (block 115). The editing software (116) may modify the metadata (106) in a variety of ways. For example, the editing software (116) may add new metadata (118) that describes the manipulation of the image by the user. For example, the user may crop the original image to form a cropped image (108-2). The new metadata (118) may define the amount cropped from the top, left, right, and bottom of the image, the crop angle, the width of the cropped image, the height of the cropped image, and other metadata.

Additionally the user may add keywords to the metadata that describe the image. For example, an image of a girl in Paris may include the key words such as "girl, sitting, Kaitlyn, Paris, Eiffel tower, sightseeing, summer, travel, river, Seine" and other keywords that describe the image. This keyword metadata can greatly aid in classification and searching for images. An image caption description "Kaitlyn sitting on a railing next to the Seine River. Paris, France, near the Eiffel Tower" could also be included in the new metadata (118). The user then stores the cropped image (108-2) and its associated metadata in the same or a different electronic repository. The storage of the images in the electronic repository can be the source of additional metadata. For example, the user may store the cropped image (108-2) in a directory such as C:/My Pictures/Summer 2014 in Paris/best photos. The name of the various folders, the way the images are grouped together, and other information in the file structure can be used to provide context and keywords that could be included in the metadata. A variety of imaging software, such as tools for organizing and viewing images, can display and add metadata to an image.

Unfortunately, using editing software can also result in a substantial loss of metadata as shown by the empty dashed box (117). In general, any software that has permission and access to the photo's file has the potential to alter or damage the metadata stored in the file (either the capture metadata in the EXIF or the image editing XMP metadata). This irretrievable loss of metadata can be a significant challenge because the identity, sources, and history of the image becomes unclear.

After generating and editing an image, the user may then select any number of versions of the image to distribute (block 120). For example, the user may post a version of the image (108-3) on a website (121) that describes her trip to Paris. In this example, when the image (108-3) was loaded onto the website, a large portion (122) of the existing metadata was removed. There may be a variety of reasons for removing metadata from the image, including maintaining privacy. In some circumstances, the website may eliminate the data that is not relevant to its particular needs. Additionally, the website software may automatically perform a number of operations on the image when it is uploaded. For example, the website may rename, resize, copy, and perform other operations on the image (108-3). Because of the elimination of the metadata and other operations, the image (108-3) may not include any metadata that records an association with the original image (108-1). For example, remaining metadata may simply be the data that is important in displaying the image. For example, the remaining metadata may include the luminance table, chrominance table, International Color Consortium (ICC) profile, and image size in pixels.

The website also includes additional content/context (124) for the image. For example, the additional content/context (124) may include the user's description of the image and comments made by those who view the image and read the blog entry. Keywords and emotional reactions to the image could be extracted from this information. Utilizing the user comments, a fairly accurate assessment of whether the image was positively or negatively received could be made. The content of the user comments can also be used as a gauge of the strength of the reactions to the image. Furthermore, the additional content/context may include statistical measures of the importance of the image, such as the number of views or the number of comments made.

The user may also post the image to a photo hosting website (126) such as Flickr, Snapfish, Skydrive, Webshots, ShutterFly, Pinterest, Fotolog, DeviantART or other various other websites or online applications. In this example, the user has placed the cropped version (108-2) of the original image on the photo hosting website (126). As with the blogging website, the photo hosting website may modify the image (108-2) by renaming, resizing, and/or copying the image. The photo hosting website may also delete a significant portion (127) of the metadata and add additional metadata (128). For example, the additional metadata may include security metadata such as the name of the author, a copyright notice, and usage terms. Metadata can also be derived from the context in which the image is displayed and the content (129) related to the image. For example, the context may include the album or forum in which the photo is displayed. The content (129) that is related to the image may include tags generated by the author or viewer, the number of views the image receives, comments, awards given to the image, and other data.

The user may also upload a version of the image (108-2) to a social networking site (131) such as Badoo, Facebook, Habbo, hi5, Linkedin, Myspace, Orkut, Renren, or other social networking site. As discussed above, the social networking site (131) may remove a significant portion (132) of the metadata associated with the image and/or add additional metadata (133). Metadata can also be derived from the context in which the image is displayed and the content related to the image. Context information (134) may be derived from the location the image is posted on the site or other parameters. For example, an image that is posted as wallpaper may have more emotional appeal to a user than images that are not uploaded to the website. The content that is related to the image may include comments, tags, likes, sharing/copying of the image and views. A variety of metadata can be derived from these interactions of viewers with the images.

The methods given above for distributing images are examples. A variety of other methods could be used including sending the images as email attachments or using a mobile application such as Instagram.

As shown above, as the user distributes versions of the images, new metadata can be added or derived, but existing metadata is often deleted. While additional content/context can provide desirable information about the emotional appeal of the image, the loss of most of the original data can make it extremely difficult to understand the origin and history of the image. In particular, metadata that would allow a computing device to automatically identify parent images, child images, or other related images is often deleted. For example, the date the image was created, location of where the image was taken, and the original file name of the image are all commonly deleted. Thus, although the distributed images accumulate meaningful metadata, the metadata which links the original image and its derivative images has been lost. As discussed above, this makes it challenging for a computing device to understand the full impact of an image and its derivative images.

To reestablish the connections between matching images, a system (142) for creating metadata supersets searches different image sources and identifies images that match (block 140).

The system (142) may search websites, photo hosting sites, social networks, local computers, remote computers, mobile devices, and the internet for images. The system (142) may use a variety of techniques to determine if an image is matching. For example, the system may use feature extraction to create a fingerprint of each image and then compare the fingerprints to determine if the images are matching. For example, the system (142) may extract interest points, edges, corners, regions, shapes or other features from the images to form a "fingerprint." The fingerprints of the images are compared to determine if the images are identical, derived, or dissimilar. Matching techniques can be used that are resilient to common transformations of images such as rotation, scale changes, changing resolution, cropping, lighting changes, etc. Images are considered to be "matching" if the images are identical or derived from the same original image. The term "identical" encompasses all copies of an original image. The term "derived" refers to images that are modifications of an original image. For example, a derived image may be a cropped or color balanced version of an original image.

Identifying identical and derived images can be performed by comparing the fingerprints of images. If the correspondence between two fingerprints is significant (i.e. greater than a first predetermined threshold) the two images are designated as "identical." Derivative images have fingerprints with a correspondence that is lower than the first predetermined threshold but greater than a second lower predetermined threshold. Images with fingerprints with a correspondence lower than the second threshold are dissimilar.

In some instances the thresholds may be fixed values. In other instances, the thresholds may be adjustable by the user or by the software. In one implementation, the thresholds may be set artificially low and the user can then visually inspect the images to weed out images that are not derived from the same original image. The thresholds may be ranges that are designed to consider a number of different factors, such an analysis of metadata remaining in the images. For example, if an original image has unaltered creation date of Jun. 24, 2014 and an edited image posted on a website has comment metadata generated in May 20, 2014, it is unlikely that the edited image was derived from the original image, regardless of similarity between the images.

The system (142) creates a metadata superset (146) by combining metadata from matching images (block 145) with the existing metadata from the matching images. Additional metadata can be derived from the context of the various images. As discussed above, the usage of the image (location, description, size, etc.) and reactions of viewers (such as commenting, liking, copying, etc.) can provide significant information about the emotional impact of the image. The emotional impact may include measures of positive and negative reactions, intensity of reaction, type of reaction, and magnitude of reaction. For example, a picture of the girl sitting beside a river with an iconic landmark in the background that is posted on a social networking site may generate thousands of views/likes with comments that use positive keywords like "fun," "stunning," and "gorgeous." From these comments, metadata could be derived to indicate a positive emotional reaction from a large number of people. This tells the system that this photo is more valued and has some emotional significance for the user.

Linking a number of matching images allows metadata from one image to complement metadata from another matching image. For example, creation metadata from original images may be merged with emotional impact metadata from derivative images posted on a social networking site.

The system could then generate a number of image products based on the metadata super set (block 150). For example, the combination of the creation metadata and emotional impact data may allow the system to create a chronological or location based photo book or calendar of the most meaningful images in a given year. Additionally or alternatively, the system could derive specific interests or needs of a user based on metadata. For example, one metadata store may be a user's hard drive that contains metadata for "Paris photos" and the other metadata store, Facebook, has metadata that includes a matching picture with a conversation with a girlfriend: "GF: Wow don't you look dreamy together, I see wedding bells in your future", "GirlInPhoto: Yes, it looks like we are heading that direction". Combining those two pieces of metadata by matching images would allow the system to advertise airfares to Paris, French wine, or perhaps wedding packages in France. Individually neither of the metadata sources have complete picture of the situation, but when combined the metadata allows for a significantly more relevant and accurate picture that can be used to synthesize the targeted advertising or other products.

Additional metadata that represents a conclusion drawn from analysis of the metadata superset can be added to the metadata superset. For example, the analysis of the metadata superset may produce the conclusion that "this person wants to get married to a French person, Aloin Duprey, in June 2014." These conclusions can be particularly valuable as they can capture more meaningful and specific information regarding the metadata superset. By saving these conclusions in the metadata superset, the conclusions are preserved as part of the metadata superset. Consequently, future analysis can be used to build on the conclusion rather than recreate it. Thus, the analysis of the superset of metadata can be used to create at least one of a product, a service, or additional metadata.

Figure 2:
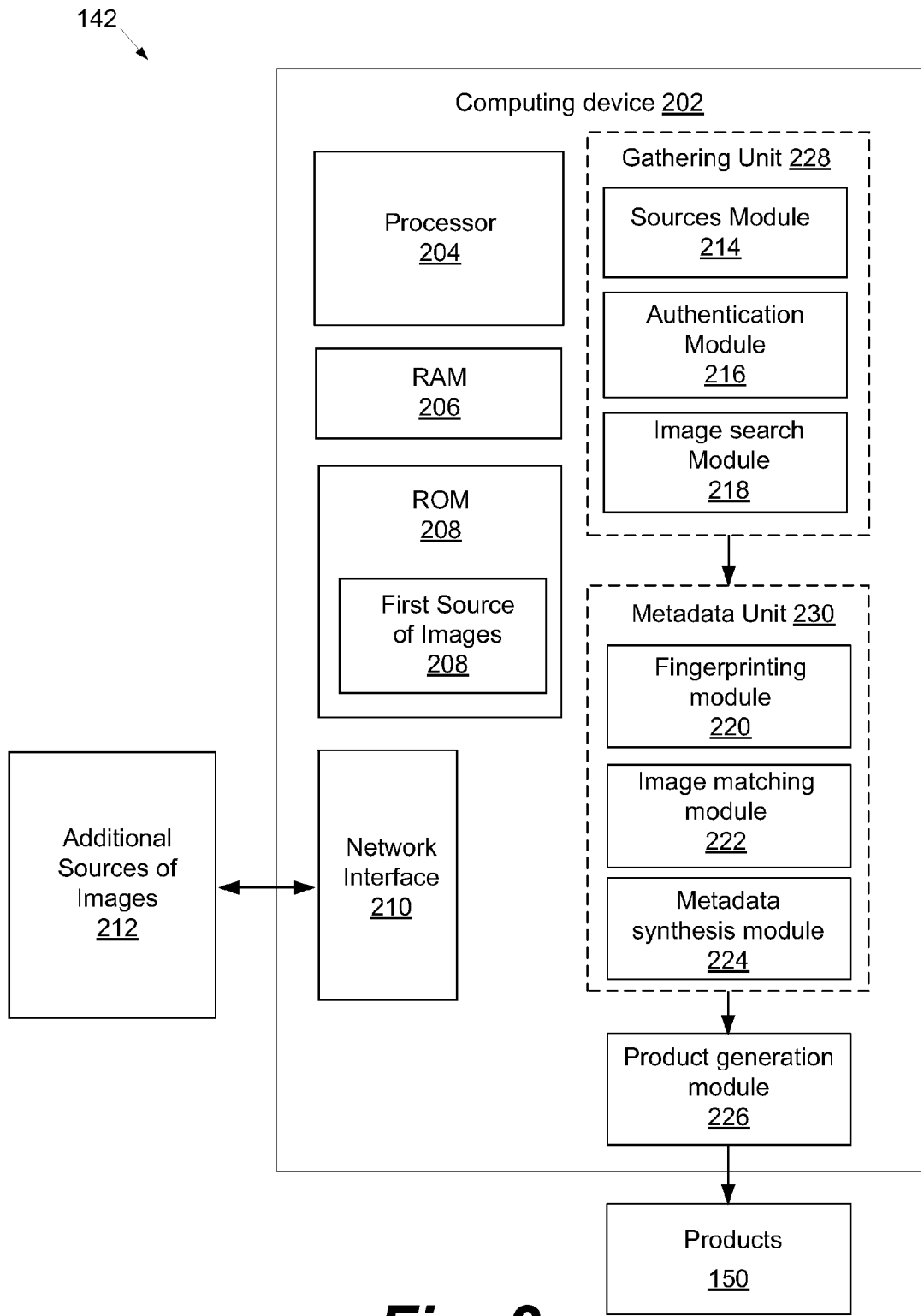
FIG. 2 is a system for forming a superset of metadata associated with matching images, according to one example of principles described herein.

FIG. 2 is one example of a system (142) for forming a superset of metadata associated with matching images and generating products based on the superset of metadata. The system (142) includes a computing device (202) with a number of modules (214-226) that are executed on a computer processor (204). The computer processor (204) may be operatively coupled to the random access memory (RAM) (206) and read only memory (ROM) (208). The RAM (206) and ROM (208) are illustrated as being local to the computing device (202). However, in some examples, one or both of these memories may be located remotely.

In one implementation, a gathering unit (228) includes a sources module (214), an authentication module (216) and an image search module (218). The sources module (214) includes a listing of potential sources of data and associated metadata. As discussed above, the sources of data and associated metadata may be local repository, remote repository, a database, a website, a social network, a photo hosting site, internet or any other location where data with metadata is stored.

An authentication module (216) stores and uses usernames and passwords to access secured data sources. In some implementations, the operation of the authentication module (216) is controlled by the user and only sources authorized by the user are accessed. The network interface (210) allows the authentication module and other modules to access remote computing devices by either wired or wireless methods.

An image search module (218) searches the identified sources for data and metadata. In some implementations, the image search module (218) retrieves images and associated metadata via the network interface and stores the images and associated metadata in the RAM or ROM. In other implementations, the image search module (218) simply identifies the location of the images. The gathering unit (228) then passes the identified images (or their locations) to the metadata unit (230).

The metadata unit (230) includes a fingerprinting module (220), an image matching module (222), and a metadata synthesis module (224). The fingerprinting module (220) analyzes the images to extract a number of features from the image. The type, characteristics and location of the features within the image can be used to make up the fingerprint. The fingerprints that are generated by the fingerprinting module (220) are then accessed by the image matching module (222). The image matching module (222) compares the fingerprints to identify matching images. The image matching module (222) can transform the fingerprints in a variety of ways to ensure that derivative images that have been cropped, scaled, rotated, or otherwise manipulated can be correctly identified.

The image matching module (222) then outputs the groups of matching images to the metadata synthesis module (224). The metadata synthesis module (224) produces a metadata superset from the matching images. For example, the metadata synthesis module may gather the available metadata and eliminate redundancies or superfluous data. In some examples, the metadata synthesis module (224) may access the sources of the images to extract additional metadata from the context in which the image was used.

The metadata superset is passed to the product generation module (226). The product generation module (226) identifies a product to be generated and selects images to be used in the product by analyzing the metadata superset. The product generation module (226) may be used to select a best image from a set of matching images for inclusion in the product (150) by analyzing image characteristics of images in the set of matching images. These image characteristics may also be captured as metadata in the metadata superset. The image characteristics may include image sharpness, image color balance, composition, number of human faces in an image, the amount of area within the image that is made up of human faces, or other image characteristics.

In some examples, the user may instruct the product generation module (226) to generate a specific product or family of products. In some examples, the product (150) may include groupings of images according to an original creation time or location, in which at least some of the images in the groupings were stripped of metadata regarding the time or location of original creation when stored on the second source.

In one example, the user may indicate that she wants a photo book of her trip to Paris. However, some of the images with the greatest visible level of emotional appeal are found on her Facebook account and do not include location or time of creation metadata. Using the process described above to create a metadata superset, the product generation module can then identify images that were taken in Paris during the specified time period, gage emotional impact of the images, and automatically layout the photo book. If the images with the greatest appeal have reduced resolution, the product generation module (226) can retrieve and use the original, higher resolution images. The user can then view the photo book, make desired alterations to the operating parameters of the product generation module and then have the product generation module recreate the photo book. The user may also directly alter the content of the photo book.

Additionally or alternatively, the product generation module (226) may automatically generate some products (150) without user intervention. For example, the product generation module (226) may be part of a targeted advertising system. Based on the understanding of the user gained from the metadata superset, the product generation module can be used to match a number of offers or information specifically tailored to the user's needs. For example, if the metadata indicates the user is currently travelling in Paris, the product generation module could provide access to concierge services, tickets to shows, directions to highly rated local restaurants, or other relevant information. In some examples, the metadata may also be used to market products to "friends" of the user. The metadata can provide an indicator of which friends of the user are closer to the user by analyzing comments on images. 'Close' friends could be identified by those who frequently post positive comments about images on the user's page. This additional metadata can be used in the creation of higher impact photo based products (photo books, calendars, T shirts, mugs, etc.) prominently featuring the desirable photo for sale to the user and also to the 'close' friends.

The system (142) described above is only one example. A variety of other systems and configurations could be used. For example, additional modules could be added, modules could be combined, or various modules could be executed on separate computing devices and communicate over a network.

Figure 3:
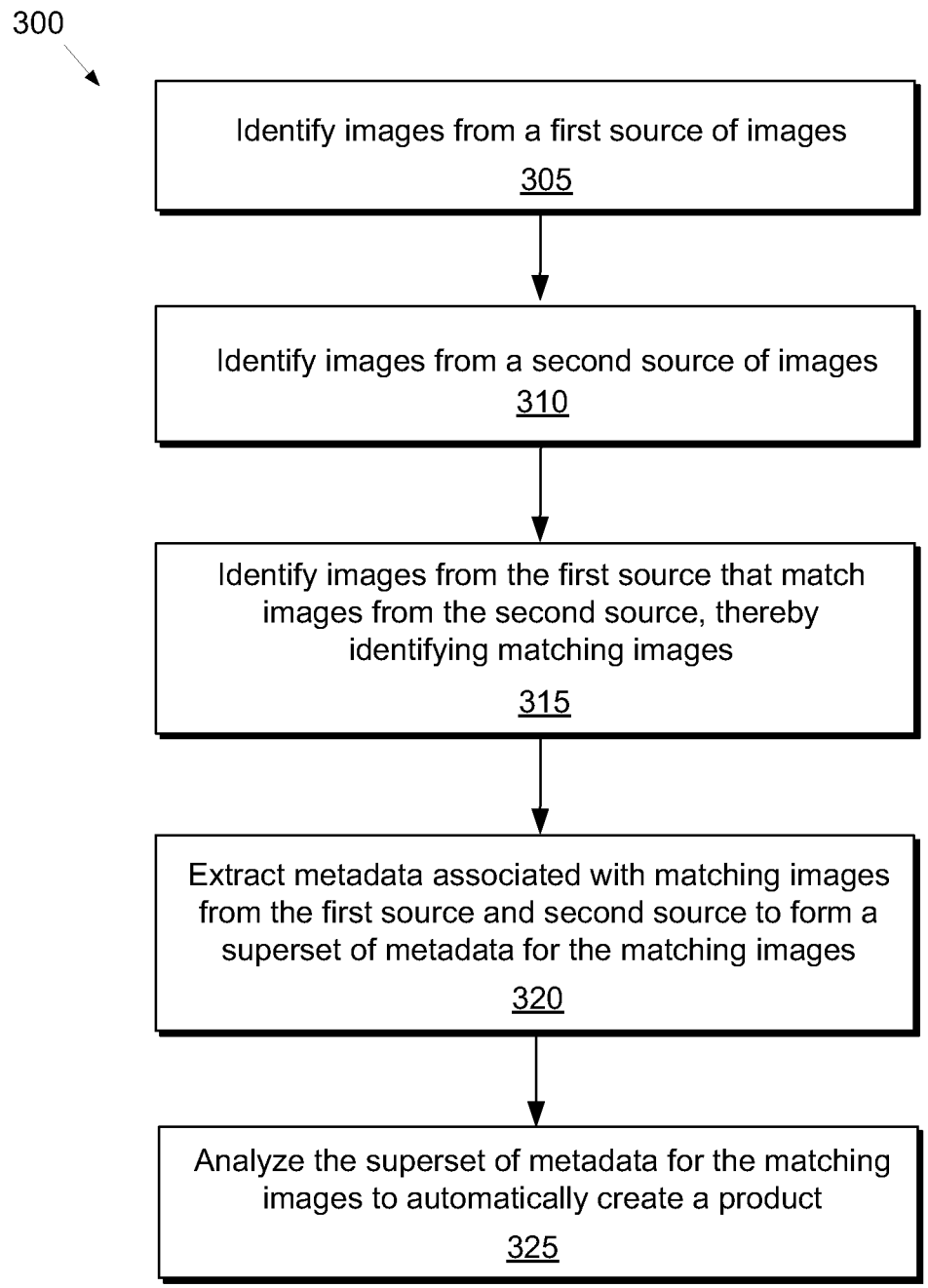
FIG. 3 is a flowchart of a method for forming a superset of metadata associated with matching images, according to one example of principles described herein.

FIG. 3 is a flowchart of a method (300) for forming a superset of metadata associated with matching images and using that superset of metadata to automatically create a product. The method includes selecting images from a first source of images (block 305). The selected images and metadata associated with the images are retrieved from the first source. In other examples, the location of the selected images and metadata is noted but the images and metadata are not retrieved at this point.

Images from a second source are identified (block 310). Images from the first source that are identical or similar to images from the second source are identified as matching images (block 315). First and second source may be local or remote data storage structures. For example, the first source may be a local photo repository where original camera images are downloaded and the second source may be a local file structure where modified images are stored to a remote photo repository such as a website or social network.

Identifying images from the first source that are identical or similar to the images from the second source may be performed in a number of ways. For example, "fingerprints" for images from the first source and images from the second source can be generated and images with substantially similar "fingerprints" can be identified as matching images. As discussed above the "fingerprints" may be formed by extracting features from the image data. In one example, the features are "corners" in the image. The corners are identified by selecting a number of anchor points within a designated area of the image. For each area, subpatches are selected and the average intensity of each the subpatches are calculated. These average intensities for each subpatch are compared to the intensity of the anchor points (or subpatch that includes the anchor point). If the subpatch is brighter than the adjacent anchor point, the output for the comparison is a binary 1; otherwise the output is a 0. In one implementation, this results in 16 bits of 0s and 1s for each anchor point. These 0s and 1s are concatenated into a binary vector that forms the descriptor for this feature. The set of binary vectors forms the fingerprint of the image that is compared to other images.

When an image on an image sharing website is scanned, the corner feature detector is applied to the image and a set of feature descriptors for all 'corners' on the photo are extracted. This fingerprint is compared to the set of corner coordinates for the original images that have a complete set of creation metadata. This technique allows the image from the website to be recognized even though it has different width and height, appears rotated or skewed and even if slight cropping or watermarking is present.

This technique is computationally efficient, compact in storage and transmission, and capable of robust feature matching between identical or similar images. The corner features are computed by comparing the intensity values of image patches so only integer addition and subtraction are used. These characteristics make it particularly suitable for mobile applications which may have lower computation power, limited storage and limited bandwidth transmission.

Metadata associated with matching images is extracted from the first source and second source to form a superset of metadata for the matching images (block 320). The metadata may already be present in the image file or may be a separate file associated with the image file. In some examples, the desired metadata may be extracted from content that is related to the image. For example, extracting metadata may include extracting emotional appeal data from a remotely hosted image repository. The emotional appeal data captures human interaction with the image and includes at least one of the following: a number of views of the image, number of downloads of the image or copying of the image, modification of the image, tagging of the image, comments about the image, placement of the image for display, placement of the image within a file structure, or other human interaction with the image.

The superset of metadata for the matching images is analyzed to create a product (block 325). For example, analyzing the superset of metadata may include arranging the images in a time sequence according to a time when each image was originally created and presenting the images in the photo product according to the time sequence. At least some of the images arranged in the time sequence may have been stripped of metadata regarding the time of creation, but the time metadata was recovered in the metadata superset. Additionally or alternatively, analyzing the superset of metadata to create a product may include arranging the images in a location sequence according to a location at which each image was originally created and presenting the images in the photo product according to location. At least some of the images arranged in a location sequence were stripped of location metadata, but this location metadata was recovered in the metadata superset.

As discussed above, the product produced from the superset of the metadata may be a photo product, an information product, or another type of product. For example, where the product is a photo product, the method may include selecting a best image from a set of matching images for inclusion in a photo product. Selecting the best image may include analyzing the metadata superset to determine a level of emotional appeal of an image. For example, a best image may have the highest level of positive emotional appeal. Additionally or alternatively, the selection of a best image may be informed by directly analyzing image characteristics of images in the set of matching images to determine which image is most appealing. The image characteristics may include image sharpness, image color balance, composition, number of human faces, or other characteristics.

In conclusion, there are a wide variety of sources of images and metadata. For example, the rise in popularity of social networking and photo sharing websites has created large online photo repositories of consumer content. However, these websites frequently strip the photo's metadata, change the file name, and the image size. The principles described above compare detected fingerprints to determine similarity between images that have different amounts and types of metadata. This technique is automatic, computationally efficient and is robust to many geometric distortions and image manipulations. Once a match is found, the metadata from the matching images is combined. Where human interaction has generated additional information, metadata can be generated that defines which photos are viewed favorably by the user and the other viewers of the image. This metadata is added to the metadata superset. For example, when the image is on a photo sharing site, comments about the image can be processed with sentiment analysis to understand the emotional reaction of the user and the viewers to the image. This can produce a more nuanced understanding of the emotional impactful of the image and produce a more target product.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for creating and using metadata supersets for matching images comprising with a computing device:
    identify images from a first source of electronic images;
        identify images from a second source of electronic images;
    identify images from the first source that match images from the second source based on content of the images, thereby identifying matching images, matching images being any of: identical images, images derived from a common original source, and an original image and an image derived therefrom;
    extract metadata associated with matching and combine that metadata together to form a superset of metadata for the matching images; and
    analyze the superset of metadata to create at least one of a product, a service, or additional metadata that is a conclusion drawn from the superset of metadata.

2. The method of claim 1, in which identifying images from the first source that match images from the second source comprises:
   creating fingerprints for images from the first source and images from the second source; and
   determining which images have substantially matching fingerprints.

3. The method of claim 2, in which creating fingerprints for images from the first source and images from the second source comprises analyzing image data to detect corners within an image.

4. The method of claim 1, in which the first source of images comprises a local photo repository and the second source of images comprises a remotely hosted photo repository.

5. The method of claim 1, in which extracting metadata associated with matching images from a second source comprises extracting emotional appeal data from a remotely hosted image repository, in which the emotional appeal data comprises metadata capturing human interaction with the image including at least one of: a number of views of the image, number of downloads of the image, copying of the image, modification of the image, tagging of the image, comments about the image, placement of the image for display, and placement of the image within a file structure.

6. The method of claim 1, in which analyzing the superset of metadata comprises arranging the images in a time sequence according to a time when each image was originally created and presenting the images in the photo product according to the time sequence, in which at least some of the images arranged in the time sequence were stripped of time of original creation metadata when stored on the second source.

7. The method of claim 1, in which analyzing the superset of metadata comprises arranging the images in a location sequence according to a location at which each image was originally created and presenting the images in the photo product according to location, in which at least some of the images arranged in a location sequence were stripped of location metadata when stored on the second source.

8. The method of claim 1, further comprising selecting an image from a set of matching images for inclusion in a photo product.

9. The method of claim 8, in which selecting said image comprises analyzing image characteristics of images in the set of matching images, the image characteristics comprising one of: image sharpness, image color balance, composition, and number of human faces.

10. The method of claim 8, in which selecting said image comprises analyzing the superset of metadata to determine a level of emotional appeal of an image.

11. The method of claim 1, further comprising:
   setting a threshold for image matching low enough that at least some false matches are identified; and
   receiving user input from visual inspection to disqualify the false matches from being considered matching images.

12. The method of claim 1, further comprising adding metadata to said superset based on posted viewer reactions to one of the matching images.

13. The method of claim 1, further comprising adding metadata to said superset based on a location at which one of the matching images is stored.

14. The method of claim 1, further comprising adding the conclusion drawn from the superset of metadata to the superset of metadata.

15. A system comprising:
   a first source comprising first set of images and a first set of metadata associated with the first set of images;
   a second source comprising a second set of images and a second set of metadata associated with the second set of images;
   a computer processor to execute;
      a fingerprinting module and an image matching module to identify matching images in the first image source and second source;
      a metadata synthesis module to create a superset of metadata for matching images; and
      a product generation module to analyze the superset of metadata for the matching images to create a product.

16. The system of claim 15, in which the metadata synthesis module is to extract metadata from human interaction with matching images, the extracted metadata comprising a measure of emotional appeal of the matching images.

17. The system of claim 15, in which product generation module is to select an image from a set of matching images for inclusion in the photo product by analyzing image characteristics of images in the set of matching images, the image characteristics comprising one of: image sharpness, color balance, composition, and number of human faces.

18. The system of claim 15, in which the product generation module automatically generates an advertising product from analysis of the superset of metadata.

19. The system of claim 15, wherein the superset comprises creation metadata and emotional impact metadata.

20. A computer program product for automatically creating a photo product, the computer program product comprising:
   a non-transitory computer readable storage medium having computer readable program code embodied therewith, the computer readable program code comprising:
      computer readable program code to identifying images from a first source that match images from a second source, thereby identifying matching images;
      computer readable program code to retrieve metadata associated with the matching images from the first source and second source, thereby creating a superset of metadata for the matching images; and
      computer readable program code to analyze the superset of metadata for the matching images to automatically create a photo product.

* * * * *